Aug. 9, 1932.  L. L. JONES ET AL  1,870,735
ART OF ROASTING EDIBLES
Filed July 5, 1928
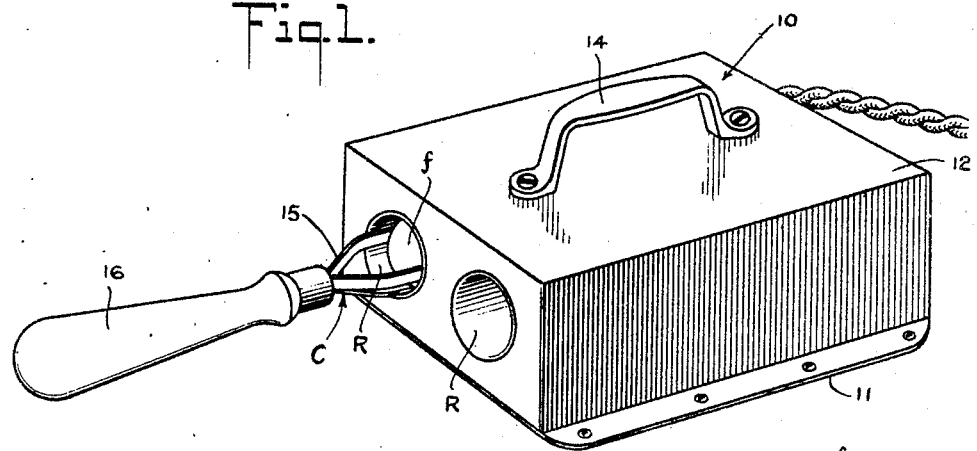
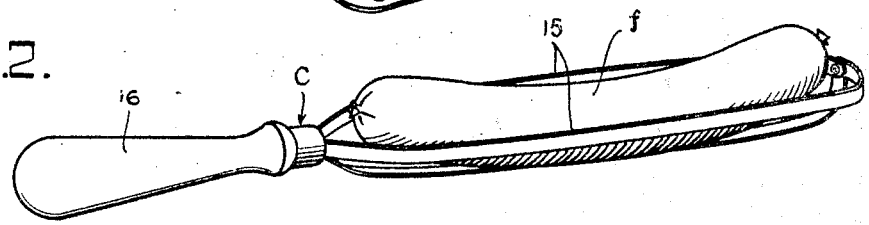
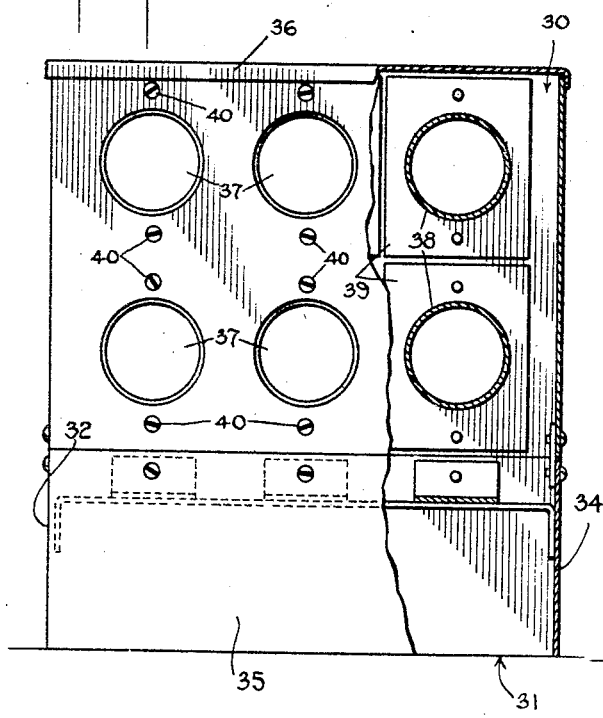
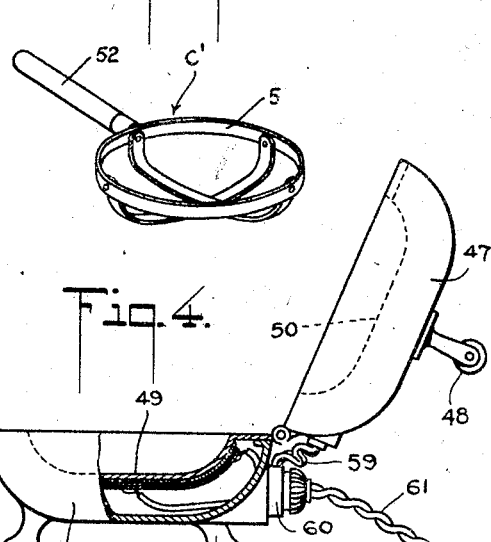
INVENTORS
LESTER L. JONES and
JOSEPH JONES
BY
ATTORNEYS Patented Aug. 9, 1932

1,870,735

UNITED STATES PATENT OFFICE

LESTER L. JONES, OF ORADELL, AND JOSEPH JONES, OF WESTWOOD, NEW JERSEY, ASSIGNORS, BY MESNE ASSIGNMENTS, OF ONE-HALF TO TECHNIDYNE CORPORATION, OF NEW YORK, N. Y., A CORPORATION OF NEW YORK, AND ONE-HALF TO MAXWELL JAMES, OF NEW YORK, N. Y.

ART OF ROASTING EDIBLES

Application filed July 5, 1928. Serial No. 290,487.

This invention relates to the art of roasting or heating edibles and relates more particularly to a method of and apparatus for roasting edibles having a pre-formed shape or predetermined dimensions; and has special reference to the provision of a roaster or toaster for ground meats such as Frankfurters and the like.

The prime object of our present invention centers about the provision of a method of and apparatus for roasting ground meats such as Frankfurters and the like which constitute improvements in the art of roasting edibles disclosed and claimed in the co-pending application of Joseph A. Flanzer, Serial No. 290,515 filed, July 5, 1928. As set forth in said application, it has been customary to roast ground meats such as Frankfurters by either boiling the same in water or by frying on an open pan or flat iron griddle. As is well known, the method of toasting Frankfurters on an open griddle disadvantageously consumes both a substantial time and constant attention, since it takes from ten to fifteen minutes to toast a Frankfurter by the griddle method and very often Frankfurter will be left on the griddle for as long as 30 minutes, requiring constant attention to prevent over-roasting or burning. The griddle type of apparatus, moreover, is ill adapted for home or kitchen use, so that for home use the boiling method is commonly resorted to. By means of the method and apparatus of the present invention, these and other disadvantages inherent in former roasting methods are eliminated, so that Frankfurters and like edibles may be completely toasted within the short space of a minute or two, with the result that the meat may be prepared and served on short order, the method of the invention having the further result of imparting a new and delectable flavor to the toasted product, the roasting apparatus being furthermore adapted for both commercial and home kitchen use.

In accordance with the method of the invention an edible of pre-formed shape and dimensions is roasted by encasing the same in a heating receptacle having an internal shape and dimension substantially the same as those of the edible whereby the receptacle forms an envelope for the edible and whereby upon heating the receptacle the developed heat is concentratedly directed substantially uniformly over the entire exposed surface of the edible. To secure the optimum advantages of the invention, the internal dimensions of the envelope receptacle should closely approximate those of the edible; and where this is the case, difficulty is sometimes experienced in the removal of the roasted edible due to a tendency of the edible, such as for example, a Frankfurter, to stick to the wall of the heating receptacle by reason of overheating or lack of fat on some one or more regions in the receptacle. The prime improvement obtained by our present invention is the provision of a roaster embodying means which function to obviate this tendency to sticking or adhering of the edible to the receptacle wall. Other improvements of our present invention relate to the provision of a carrier for the edible designed and constructed so as to permit a convenient and sanitary handling of the edible as well as to function for obviating or eliminating this "sticking" of the roasted edible.

To the accomplishment of the foregoing and such other objects as will hereinafter appear, our invention consists in the elements and their relation, one to the other, as hereinafter more particularly described and sought to be defined in the claims; reference being had to the accompanying drawing which show the preferred embodiments of our invention, and in which:

Fig. 1 is a perspective view of one form of roasting apparatus embodying the invention;

Fig. 2 is a perspective view of the carrier employed therewith and showing the manner of its use;

Fig. 3 is a front elevational view of a modified form of the invention with a part broken away to disclose the interior construction thereof;

Fig. 4 is a view of a further modified form of the invention with a part broken away; and Fig. 5 is a part employed in the apparatus of Fig. 4.

Referring now more in detail to the drawing and having reference first to Figs. 1 and 2 thereof, wherein we show our invention employed in one form of roaster described and claimed in the aforesaid application of Joseph A. Flanzer, the method of the invention is shown to consist of roasting an edible of a pre-formed shape or predetermined dimensions such as a Frankfurter $f$, by encasing the same in a receptacle R having an internal shape or internal dimensions substantially the same as those of the edible whereby the receptacle R forms an envelope for the edible, the said receptacle being heated substantially over its complete enveloping surface.

The receptacle R which, in the embodiment shown in Figs. 1 and 2 of the drawing is tubular and cylindrical, is open at both ends, the Frankfurter $f$ being introducible into the receptacle from either end, and preferably the tubular heating receptacle has a length slightly greater than that of the Frankfurter $f$. This tubular receptacle is heated to about a temperature of 300° C., and high enough to roast a Frankfurter in about one to two minutes, the envelope receptacle being heated substantially uniformly over its entire enveloping surface so that the Frankfurter is treated at the same time and uniformly over its complete exposed area. It has been found that by this method Frankfurters may be prepared not only on short order, but that the flavor imparted to the Frankfurter is different and more delicious than that obtained with the ordinary griddle toasted Frankfurter.

Another advantage secured with this invention is that the Frankfurter when removed from the receptacle is substantially straight and uncurled lending itself therefore to facile reception and encasement by the usual straight Frankfurter roll. It will be also noted that by encasing the edible in an envelope heater closely fitting the same, the heat is concentrated upon all parts of the edible, resulting in the rapid and efficient toasting of the same.

The toasting apparatus may be made in gang formation so as to treat a plurality of banked Frankfurters at the same time, and in the embodiment shown in Figs. 1 and 2 of the drawing, we show a portable gang toaster designed for home use and adapted to be operated electrically by attachment to a power line socket. Such a toaster may comprise a metal frame enclosure 10 which serves as a convenient holder for a plurality, such for example as two tubular receptacles R, R, the said holder comprising a bottom plate 11 to which is affixed a rectangular-shaped container 12, to the front and rear walls of which are swaged the ends of the tubes R, R. The space within the metal frame enclosure 10 may be either left empty or filled with a heat insulating material such as powdered asbestos, and the top of the holder 10 may be provided with a heat insulating handle 14.

In the operation of the roaster, where the internal dimensions of the envelope receptacle closely approximate those of the edible, some difficulty is experienced in the removal of the roasted edible due to a tendency of the edible, such as the Frankfurter, to stick to the wall of the heating receptacle by reason of overheating or lack of fat on some one or more regions in the receptacle. To obviate any such tendency to sticking or adhering of the edible to the receptacle wall, we employ a carrier C for the edible which is designed to facilitate the handling of the edible and the insertion and removal thereof to and from the toasting apparatus. Preferably this carrier C comprises a cradle construction 15 connected to a heat insulating handle 16. The cradle 15 is preferably open at its top and is provided with three or more longitudinal flat strips of thin sheet steel curved to conform to the surface of the Frankfurter $f$ and the heating receptacle R. The Frankfurter $f$ is first placed in the cradle C in the manner shown in Fig. 2 of the drawing, and the cradle carrier with its contents is then inserted into the heating receptacle R. With the use of this carrier, the Frankfurter can be easily removed from the heater, and when the Frankfurter sticks at one or more regions to the walls of the receptacle, the adhesion can be readily broken by rotating the carrier C by means of its handle 16, the strips of the cradle 15 acting as slicing knives to cut or wedge apart the adhering surfaces. This carrier also has the advantage of rendering it unnecessary to handle the hot Frankfurter, as well as of insulating cleanliness in handling, since after the carrier C is removed with the Frankfurter $f$ therein, the carrier can be inverted and the Frankfurter dropped into the usual split roll.

The toasting unit shown in Figs. 1 and 2 of the drawing is of a portable electric type, the heating receptacles R, R being designed for use with ordinary house lighting current. To accomplish these ends, the heating receptacles R, R are designed to embody a construction such as is more particularly described and claimed in the aforesaid co-pending application of Joseph A. Flanzer.

The advantages of such a portable electric toasting unit will be readily apparent. Besides permitting Frankfurters to be toasted upon short order and producing an improved edible product which is handled in a very sanitary manner, the apparatus permits of installation in places where gas is unavailable, the same being constructed so as to produce a portable and serviceable device.

In Fig. 3 of the drawing, we show a modified form of the toasting apparatus adapted to be heated by external heat, such as gas, and constructed so as to be capable of being set on top of the ordinary home gas stove or range. In this form of the invention, the toaster comprises a casing generally designated as 30 open at its bottom at 31 and provided with enclosing side walls 32 to 35 and a top wall 36 forming a closure for the casing, the said casing being made of sheet metal parts secured together by any suitable securing elements. The front wall 33 and the opposed rear wall of the casing are provided with apertures or windows 37 and to said walls are attached a plurality of tubular receptacles 38—38, the ends of which register with the windows 37, the said tubular receptacles forming the enveloping tubes for the edibles to be roasted. Each of the tubular receptacles 38 may comprise a sheet metal tube having flanged sections 39—39 swaged to the ends of the tubes, the said flanged sections providing means securable to the opposite walls 33 and 35 of the casing by means of securing elements 44. The carrier C for the edibles shown in Fig. 2 of the drawing is employed with this gas heating form of roaster shown in Fig. 3 of the drawing, it being understood that a plurality of these carriers may be used in gang formation where it is desired to roast a plurality of Frankfurters at the same time.

In Figs. 4 and 5 of the drawing, we show a still further modification of the invention designed for roasting hamburger steaks. When used for this purpose, the roaster may comprise a two-part receptacle having a bottom or base 46 and a movable such as a hinged lid section 47 provided with a handle 48. These receptacle sections are provided in turn with the heating units 49 and 50 which, when the lid 47 is closed, form a receptacle having a shape or dimensions substantially the same as those of the preformed hamburger steak so that the heating units form or define a substantially close fitting envelope for the edible, as will be readily understood. For cooperation with this form of toaster, we employ a carrier C' having an open cradle 51 attached to a handle 52, the said cradle having a design or construction similar to the cradle 15 heretofore described and being made of strips which are given a contour, as shown in Fig. 5 of the drawing, for closely fitting the heating unit 49 of toaster.

Each of the heating units such as 49 or 50 is preferably made in the same way as the heating units of Figs. 1 and 2 of the drawing and as described more in detail in the aforesaid co-pending application of Joseph A. Flanzer. The heating units 49 and 50 may be connected in parallel as by means of the conductors 59 and to a plug or socket 60 attached to and forming a part of the toaster unit. The electrical cord 61 is in the usual way receivable by the plug or socket 60 and is attachable to the ordinary power line receptacle.

The electrical toasting apparatus shown in Figs. 4 and 5 of the drawing is intended to be used in the same way as that shown in Figs. 1 and 2 of the drawing. The hamburger steak pre-formed in shape is inserted in the cradle of the carrier C' and the carrier is then placed in the toaster and the lid 47 is then closed. Movement of the handle 52 of the carrier C' sideways will rotate the carrier and tend to free the steak from adhering to the lower half of the heater. After being toasted, the steak can then be put on a plate or in a sandwich by inversion of the carrier and without further manual handling.

The manner of making and using the improved toasting apparatus of our present invention and the many advantages thereof will, in the main, be fully apparent from the above detailed description thereof. It will be further apparent that while we have shown and described our invention in the preferred forms many changes and modifications may be used in the structure disclosed without departing from the spirit of the invention defined in the following claims.

We claim:

1. In combination, a roaster for meats of pre-formed shape and dimensions comprising a roaster receptacle having an internal shape and dimension substantially the same as those of the meat to be roasted whereby the receptacle forms an enveloping casing for the meat, and a carrier for the meat conforming closely to the internal shape and dimensions of the lower part of said receptacle and removably receivable by the receptacle.

2. In combination, a roaster for Frankfurters comprising a tubular heating receptacle having an internal shape and size such that the receptacle forms an enveloping casing for the Frankfurter, and a carrier for the Frankfurter conforming closely to the internal shape and size of the lower part of said receptacle and removably receivable by the receptacle.

3. In combination, a roaster for meats of pre-formed shape and dimensions comprising a roaster receptacle having an internal shape and dimension substantially the same as those of the meat to be roasted whereby the receptacle forms an enveloping casing for the meat, means for heating said receptacle over substantially its complete enveloping surface, and a carrier for the meat conforming closely to the internal shape and dimensions of the lower part of said receptacle and removably receivable by the receptacle.

4. In combination, a roaster for edibles of pre-formed shape and dimensions comprising a heater receptacle having an internal shape and dimension substantially the same as those of the edible whereby the receptacle forms an enveloping casing for the edible, and a carrier for the edible conforming closely to the internal shape and dimensions of the receptacle and removably receivable by the receptacle, said carrier comprising an open cradle for the edible having only limited regions of contact with the interior wall of the receptacle so that substantially the entire edible is heated directly by said receptacle.

5. In combination, a roaster for edibles comprising a heater receptacle forming an enveloping casing for the edible, and a carrier for the edible conforming to the internal configurations of the receptacle and removably receivable by the receptacle, said carrier comprising a plurality of supporting blades having only limited regions of contact with the internal wall of said receptacle, said blades functioning as slicing or separating knives for the edible when moved in the receptacle.

6. A roaster for meats of pre-formed shape and dimensions comprising a holder, a plurality of heater receptacles arranged in gang formation on the holder, each receptacle having an internal shape and dimension substantially the same as those of the meat whereby each receptacle forms an enveloping casing for the meat, and a carrier for the meat conforming closely to the internal shape and dimensions of the lower part of said receptacles and removably receivable thereby.

7. A carrier for edibles adapted to be removably inserted in a roaster, said carrier comprising a cradle conforming to the dimensions of a pre-formed edible, said cradle including a plurality of supporting blades adapted to serve as slicing or separating knives for the edible.

8. A carrier for edibles adapted to be removably inserted in a roaster, said carrier comprising a cradle receptacle conforming to the dimensions of a pre-formed edible and to the roaster, said cradle receptacle including a plurality of supporting blades adapted to have only limited regions of contact with the internal wall of the roaster and adapted to serve as slicing or separating knives for the edible upon movement of the carrier in the roaster.

9. In combination with a roaster for edibles, a carrier for the edibles conforming to the internal shape of the roaster and adapted to be removably inserted in the roaster, said carrier comprising a receptacle cradle made of flexible metal strips conforming to the dimensions of a pre-formed edible.

10. In combination with a roaster for Frankfurters, a carrier for the Frankfurters conforming to the internal shape of the roaster and adapted to be removably inserted in the roaster, said carrier comprising an open cradle including a plurality of longitudinal strips of metal laid along a semi-cylindrical surface and conforming to the dimensions of a Frankfurter.

Signed at New York, in the county of New York and State of New York, this 2nd day of July, A. D. 1928.

LESTER L. JONES.
JOSEPH JONES.